(12) United States Patent
Roethig

(10) Patent No.: US 7,873,938 B2
(45) Date of Patent: Jan. 18, 2011

(54) METHOD FOR CONSTRUCTING A VARIABLE BITWIDTH VIDEO PROCESSOR

(75) Inventor: Wolfgang Roethig, San Jose, CA (US)

(73) Assignee: TranSwitch Corporation, Shelton, CT (US)

( * ) Notice: Subject to any disclaimer, the term of this patent is extended or adjusted under 35 U.S.C. 154(b) by 418 days.

(21) Appl. No.: 12/163,105

(22) Filed: Jun. 27, 2008

(65) Prior Publication Data

US 2009/0327652 A1 Dec. 31, 2009

(51) Int. Cl.
*G06F 9/455* (2006.01)

(52) U.S. Cl. .................. 716/108; 716/106; 716/107; 716/132; 700/28; 700/34; 700/36; 700/37; 714/699; 714/704; 714/722; 714/723

(58) Field of Classification Search .............. 716/1, 716/4–6, 18; 700/28–34, 36–37; 714/669–704, 714/722–723
See application file for complete search history.

(56) References Cited

U.S. PATENT DOCUMENTS

| | | | | |
|---|---|---|---|---|
| 6,278,496 B1 * | 8/2001 | Kitagawa et al. | ............ | 348/674 |
| 6,687,303 B1 * | 2/2004 | Ishihara | .................. | 375/240.21 |
| 7,124,377 B2 * | 10/2006 | Catthoor et al. | ................. | 716/2 |
| 2006/0152520 A1 | 7/2006 | Gadre et al. | | |
| 2007/0109450 A1 | 5/2007 | Lee | | |
| 2007/0200857 A1 | 8/2007 | Scheuermann | | |
| 2008/0036918 A1 | 2/2008 | Huang | | |
| 2008/0111923 A1 | 5/2008 | Scheuermann | | |
| 2009/0003502 A1 * | 1/2009 | Campiche et al. | ........... | 375/376 |

OTHER PUBLICATIONS

Akramullah et al., Optimization of H.263 Video Encoding Using a Single Processor Computers: Performance Tradeoffs and Benchmarking, Aug. 2001, IEEE, vol. 11, No. 8, pp. 901-915.*

* cited by examiner

*Primary Examiner*—Thuan Do
*Assistant Examiner*—Nghia M Doan
(74) *Attorney, Agent, or Firm*—Myers Wolin, LLC

(57) ABSTRACT

A method for designing a video processor with a variable and programmable bitwidth parameter. The method comprises selecting logical operations having propagation delay that scales linearly with the bitwidth; determining a desired tradeoff curve; and grouping instances of a logic operation having same properties; for a single instance of each logic operation, matching an actual curve of the logic operation to the desired tradeoff curve, wherein the actual curve is determined by the propagation delay and bitwidth of the logic operation.

16 Claims, 8 Drawing Sheets

METHOD FOR CONSTRUCTING A VARIABLE BITWIDTH VIDEO PROCESSOR

TECHNICAL FIELD

This invention generally relates to processing of video data, and more particularly to methods for constructing processors for processing of video data.

BACKGROUND OF THE INVENTION

A multimedia interface standard defines the connections between a multimedia transmitter (e.g., a set-top box, a DVD player, a personal computer, a video game console, etc.) and a compatible multimedia receiver (e.g., video monitor such as a digital television). Multimedia interface standards include, for example, a high-definition multimedia interface (HDMI™), a digital video interface (DVI), a display port interface, an high-definition serial data interface (HD-SDI). A typical architecture of a receiver and a transmitter compliant with the multimedia interface standards include a physical layer, a link layer, and an application layer.

An illustration of multimedia a transmitter 110 and receiver 120 including a physical layer 101, a link layer 102, and an application layer 103 is shown in FIG. 1. The physical 101 and data link layers 102 operate according to specification of the multimedia standard and design to provide a reliable mechanism for transferring video/audio data over a cable 130 connected between the receiver 120 and transmitter 110. The application layer 103 implements native video processing standards (e.g., a SMPTE and ITU-R). These standards define the requirements for video processing operations, such as color space conversion and filtering.

The video processing of is performed by a video processor (not shown) operative in the application layer 103, which is adapted to process (at the receiver 120 side) digital video data sent over the cable 130 and to send the resulting video data to a display. In addition, the video processor (at the transmitter 110 side) processes video signals received from a video source and sends the resulting video data over the cable 130.

A video processor either at the receiver 120 or transmitter 110 has to meet the physical throughput of the multimedia interface. With this aim, the video processor is typically designed as a specific-purpose digital signal processor (DSP) that can handle one or more pixel components per clock. Specifically, a conventional video processor is designed to process a certain number of bits per pixel or "bitwidth" at a given pixel clock frequency. For example, typical working points of a video processor utilized in HDMI systems are: 1) 8 bit/pixel at a pixel clock frequency of 350 MHz; 2) 12 bit/pixel at a pixel clock frequency of 225 MHz; 3) and 16 bit/pixel at a pixel clock frequency of 175 MHz.

The bitwidth is a parameter that defines the arithmetic precision of a digital signal processing operation. Typically, this parameter is hard-coded, and therefore cannot be changed during the operation of the video processor. That is, conventional video processors are typically designed to properly operate only in a single work point, trying to increase the work point to a higher clock frequency at the highest bitwidth in most cases is not feasible. For example, a video processor configured with a bitwidth of 16 bit/pixel at a clock frequency of 175 MHz may not function at a bitwidth of 16 bit/pixel at a clock frequency of 350 MHz. Accordingly, the precision and frequency of digital signal processing operations cannot be controlled during the operation of a video processor.

The problem with providing a video processor having a variable and programmable bitwidth parameter can be excessively expensive to incorporate into many types of devices. The more sophisticated the video processing functions, the more expensive, in terms of silicon die area, transistor count, memory speed requirements, and so on, the integrated circuit (IC) device required to implement such functions will be. Accordingly, IC designers are forced to make tradeoffs with respect to the video processor performance and cost. Basically, the tradeoff is higher bitwidth to achieve higher precision at a lower speed versus smaller bitwidth with less precision at higher speed. The tradeoff is a hard-coded static decision, which determined according to the value of the bitwidth parameter. Accordingly, the number of applications that a conventional video processor can support is limited.

It would be therefore advantageous to provide a video processor with a variable and programmable bitwidth parameter.

BRIEF DESCRIPTION OF THE DRAWINGS

The subject matter that is regarded as the invention is particularly pointed out and distinctly claimed in the claims at the conclusion of the specification. The foregoing and other objects, features and advantages of the invention will be apparent from the following detailed description taken in conjunction with the accompanying drawings.

DETAILED DESCRIPTION OF THE INVENTION

Figure 1:
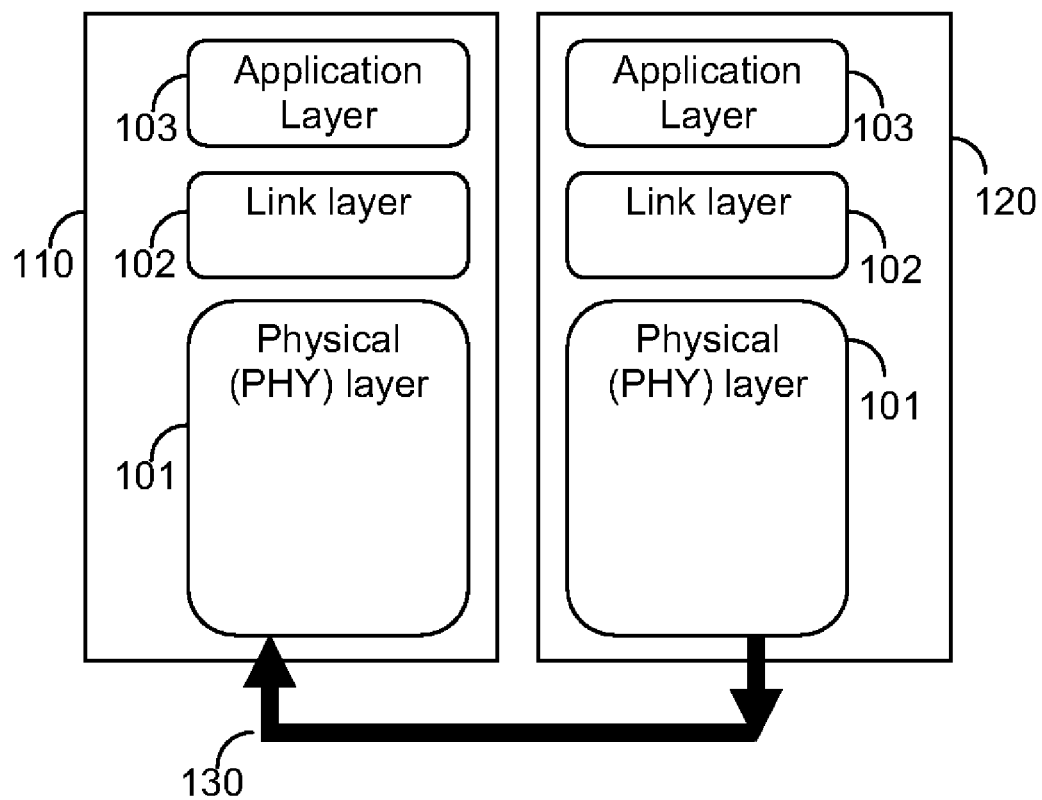
FIG. 1 is a block diagram of a multimedia interface system.

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

In certain embodiments of the invention a method for designing a video processor with a variable and programmable bitwidth is provided. A video processor constructed using the disclosed method enables flexibility in performance versus precision tradeoffs and can be utilized for a wide range of multimedia applications. In a preferred embodiment the video processor is highly efficient in HDMI systems.

Figure 2:
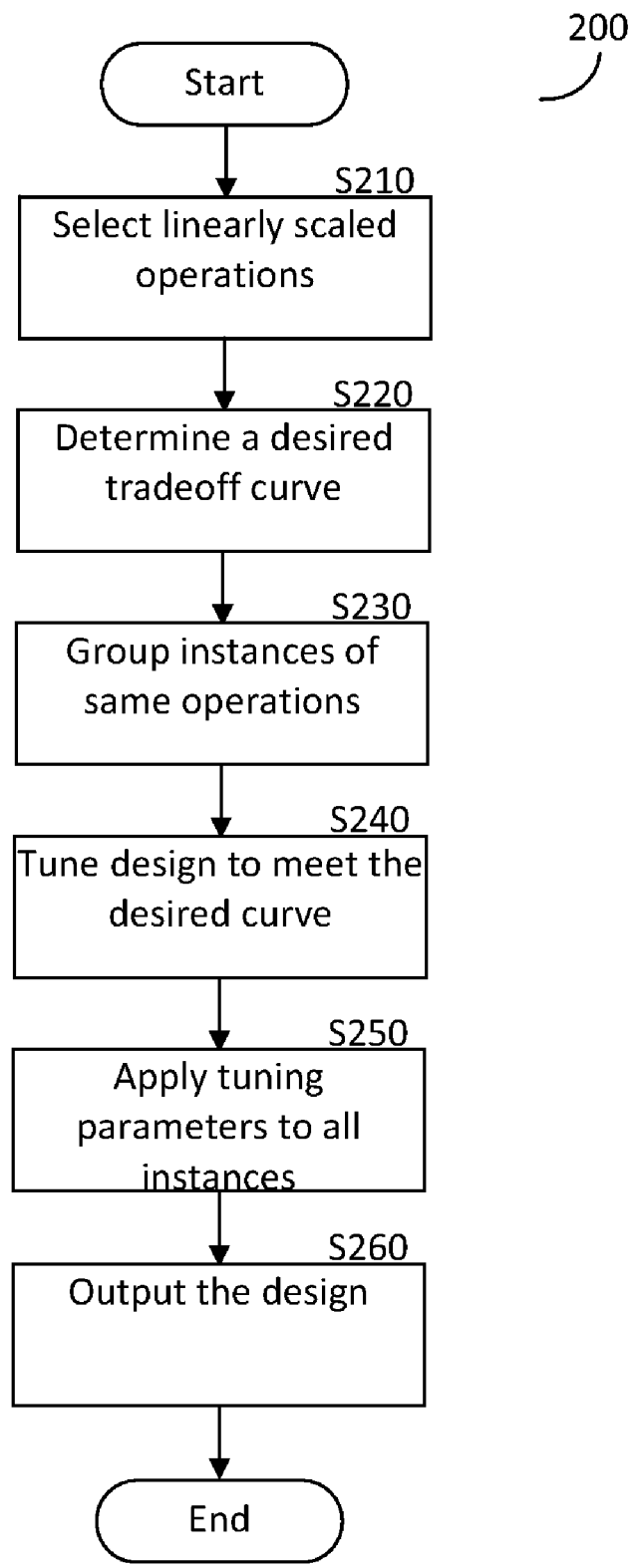
FIG. 2 is a flowchart describing a method for constructing a video processor with a variable and programmable bitwidth parameter implemented in accordance with certain embodiments of the invention.

FIG. 2 shows a non-limiting and exemplary flowchart 200 describing the method for designing a video processor with variable and programmable bitwidth parameter realized in accordance with an embodiment of the invention. The method enables to construct a video processor that its bitwidth parameter can be controlled and changed during its operation. A video processor is typically a specific purpose DSP that includes logic gates such as adders, multipliers, and comparators. A logic gate is characterized with design parameters including, for example, propagation delay, size, power consumption, and so on. The propagation delay is the length of time starting from when the input to a logic gate becomes stable and valid, to the time that the output of that logic gate is stable and valid. Often this refers to the time required for the output to reach 50% of its final output level when the input changes. The propagation delay is a function of the pixel clock frequency.

Figure 3:
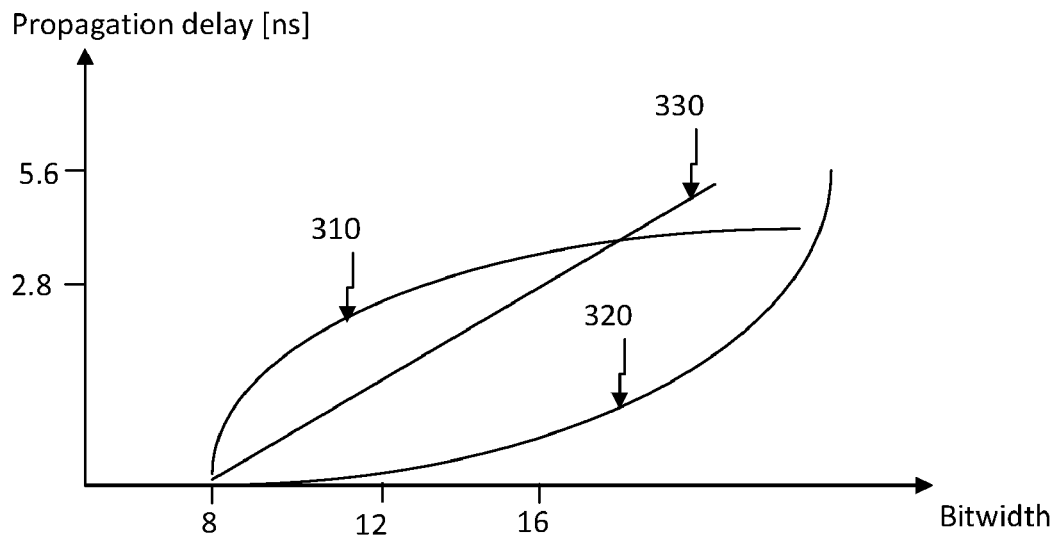
FIG. 3 is an exemplary graph showing how propagation delay scales with the bitwidth for various adder operations.

At S210 operations with a propagation delay that scales linearly or substantially linearly with bitwidth are selected. These operations are performed by the various logic gates constructing the processor. The selection may be, for example, from a library provided by an IC design (e.g., an EDA) tool. For example, adders' operations may be carry look ahead, carry selects, and ripple carry. A graph showing the propagation delay versus the bitwidth of these adder operations is provided in FIG. 3. The curves 310, 320 and 330 respectively represent carry a look ahead, carry selects and ripple carry operation. As can be noticed only the ripple carry operation, i.e., curve 330 is linearly scaled. Therefore, when designing the video processor ripple carry adders are likely to be selected and utilized. Operations that scale in a substantial linear manner are operations that deviate to some extent from linear curves.

Figure 4:
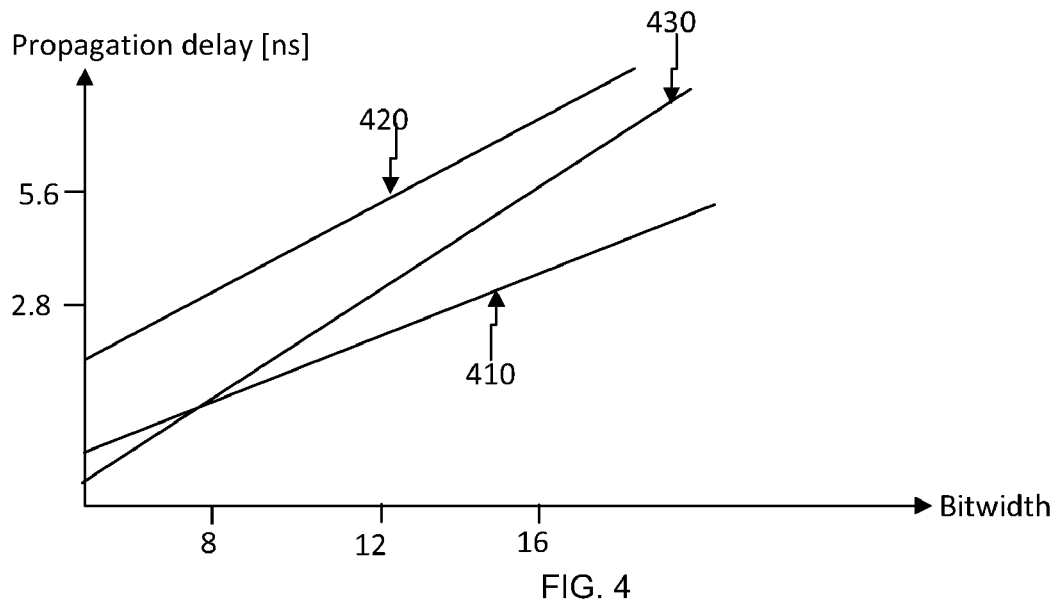
FIG. 4 is an exemplary graph illustrating a tradeoff desired curve and critical curves.

At S220 a desired tradeoff curve is determined. This curve determines the various bitwidths and pixel clock frequencies in which the processor should function. In a preferred embodiment the desired bitwidths and frequencies include: 1) 8 bit/pixel at a clock frequency of 350 MHz; 2) 12 bit/pixel at a clock frequency of 225 MHz; 3) and 16 bit/pixel at a clock frequency of 175 MHz. As the pixel clock frequency is a function of the propagation delay the desired curve is represented as a function of the propagation delay versus the bitwidth. Specifically, multiplication of a bitwidth number with a propagation delay value of any point on the curve should result with a constant number. As illustrated in FIG. 4 the desired curve (labeled as "410") is a linear curve.

At S230 instances of operations having the same properties (e.g., number of operands) are grouped together. At S240 the design is tuned so that the propagation delay and bitwidth of the design meets the desired tradeoff curve. In a preferred embodiment of the invention step S240 is performed by tuning the curves of critical operations (selected at S210) and optimizing non-critical operations. It should be noted that the tuning is performed only for one instance in a group of instances, thereafter tuning parameters are applied to all other instances in the group. For example, if multipliers $m_1$, $m_2$, and $m_3$ belong to a group of instances and the tuning process is performed on $m_1$, then the tuning parameters used for $m_1$ are also utilized for $m_2$ and $m_3$.

Figure 5:
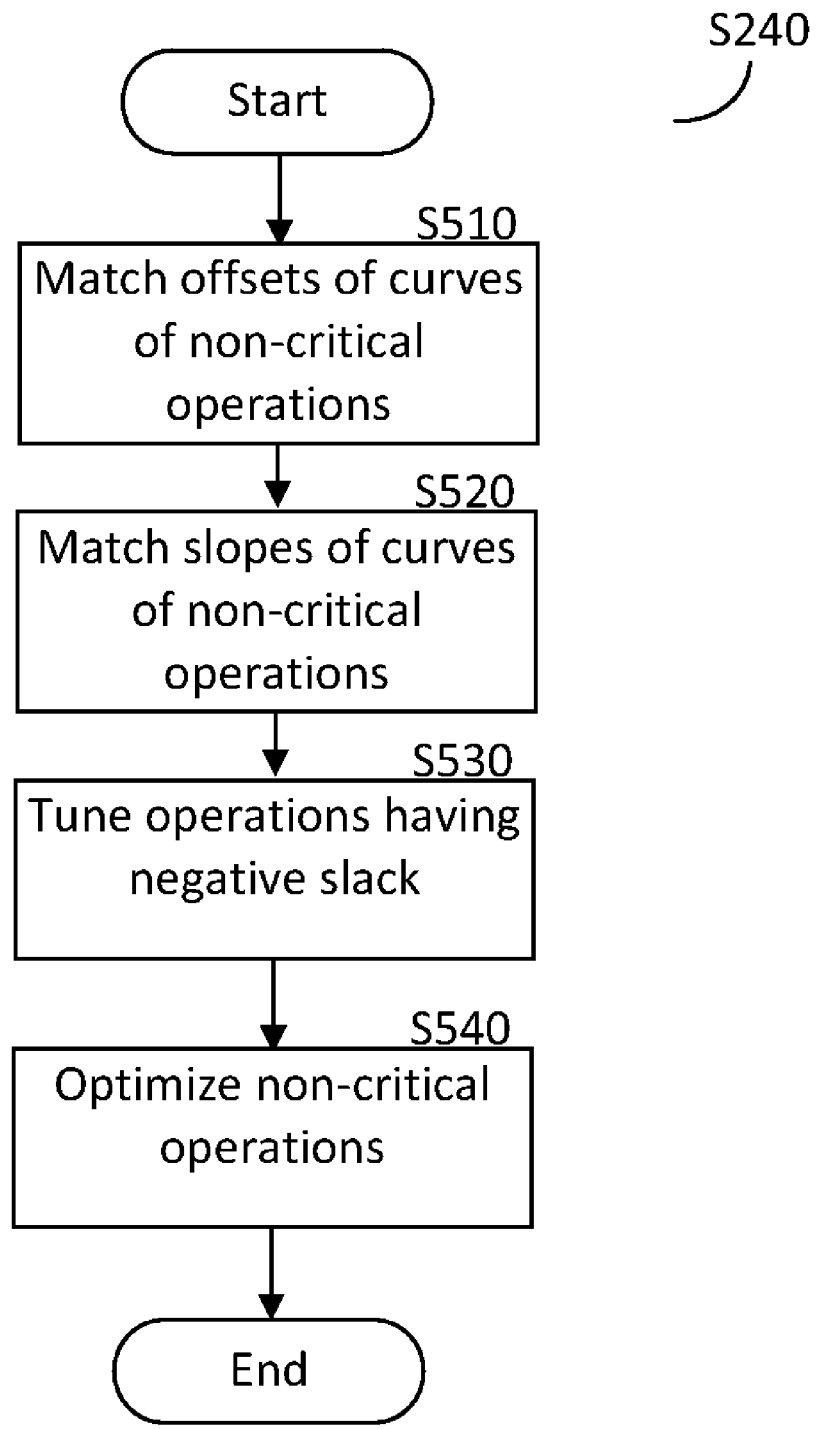
FIG. 5 is a flowchart describing a process for tuning a design of a video processor to meet a desired tradeoff curve implemented in accordance with certain embodiments of the invention.

Referring to FIG. 5 where the operation of step S240 is shown in greater detail. The tuning of critical curves includes matching the slope and offset of each curve to the desired curve 410. As shown in FIG. 4 curves 420, 430 and 440 are of critical operations. A critical operation is defined as an operation with a slack higher than a predefined threshold or a negative slack.

The following process is applied on a single instance in each group of instances. At S510, in order to match the offset of curves of operation having a slack higher than a predefined threshold, a pipeline is inserted if an offset of a given curve is larger than an offset of the desired curve. For example, a pipeline is inserted to compensate the offset of curve 420. If an offset of a given curve (e.g., curve 430) is less than an offset of the desired curve 410 no action is taken. At S520, matching the slopes of the desired curve to curves of operations having a slack higher than a predefined threshold is performed through a uniform gate sizing process. This process includes selecting logic gates (performing the critical operations) having a propagation delay less than the delay of gates that are initially selected. The uniform gate sizing may be carried by a synthesis tool during a timing optimization stage of an IC design.

Figure 6:
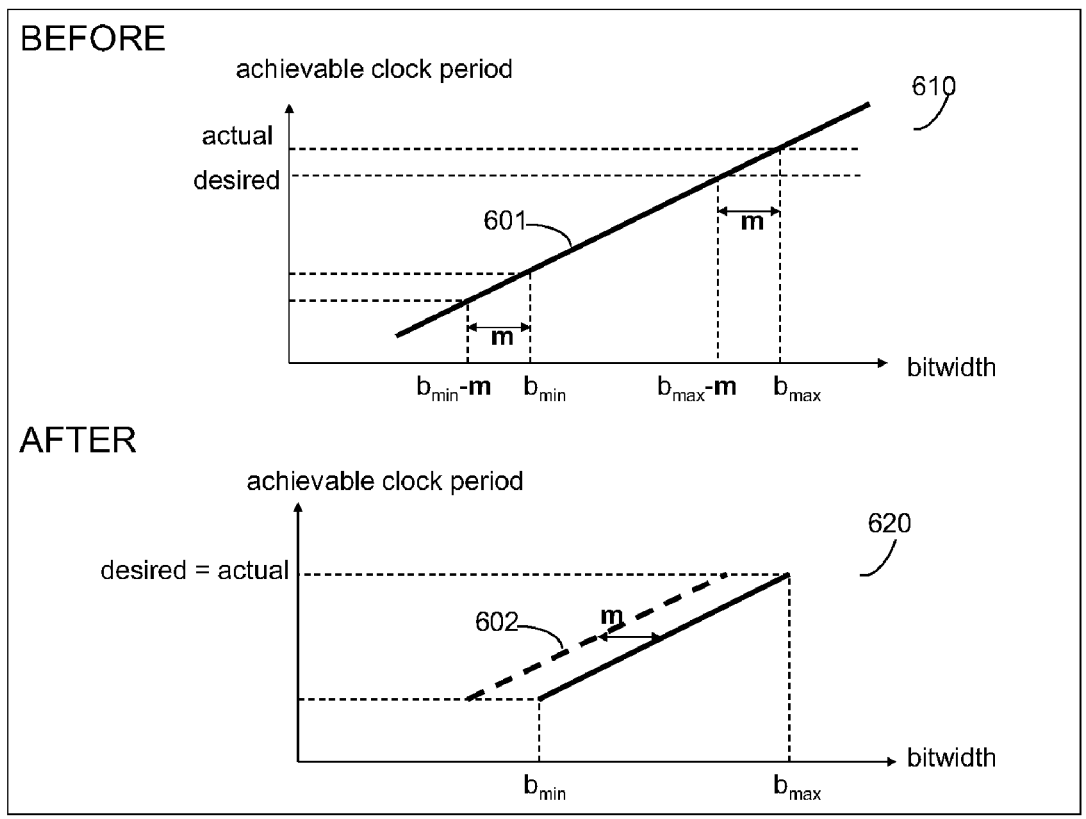
FIG. 6 shows exemplary graphs illustrating the shortening of the critical paths.

At S530, curves of critical operations with negative slack or other critical operations which could not be fully tuned during steps S510 and S520 are handled. Specifically, for such operations the critical paths are shorten by computing the number of bits for which the desired curve equals to actual curves and removing those bits that are not matched from the critical path. That is, the bitwidth of a logic operation is partitioned to at least two groups of bits one group of effective bitwidth that matches the desired curve and the other group is the extra bitwidth. This is further illustrated in FIG. 6. In graph 610, the number of bits 'm' is the difference between the actual number of bits '$b_{max}$' and the desired number of bits at an achievable clock period. Then, the 'm' most significant bits are removed from the critical operation. As a result, the time requires for processing '$b_{max}$' bits is reduced to the time originally required to process ($b_{max}$–m) bits. This applies to any bitwidth between '$b_{min}$' and '$b_{max}$'. As depicted in graph 620 the actual curve 602 is shifted by 'm' bitwidth to the right.

Figure 7:
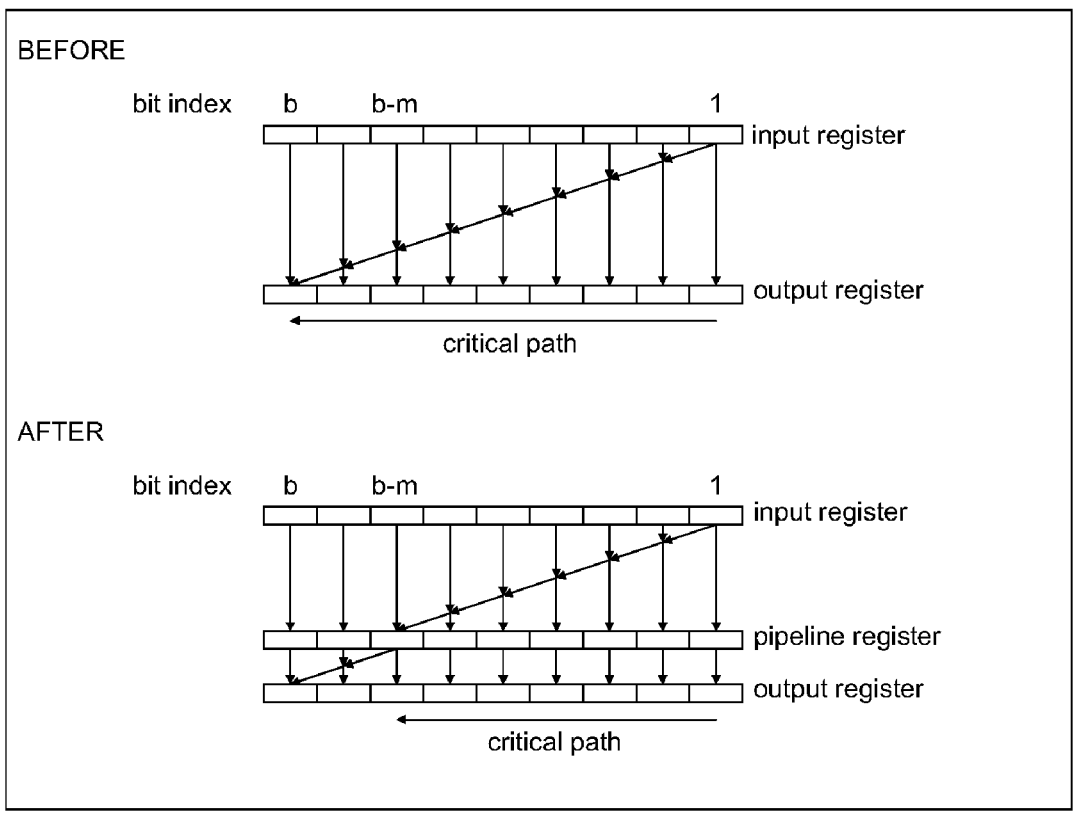
FIG. 7 is a diagram illustrating the pipeline insertion technique.
Figure 8:
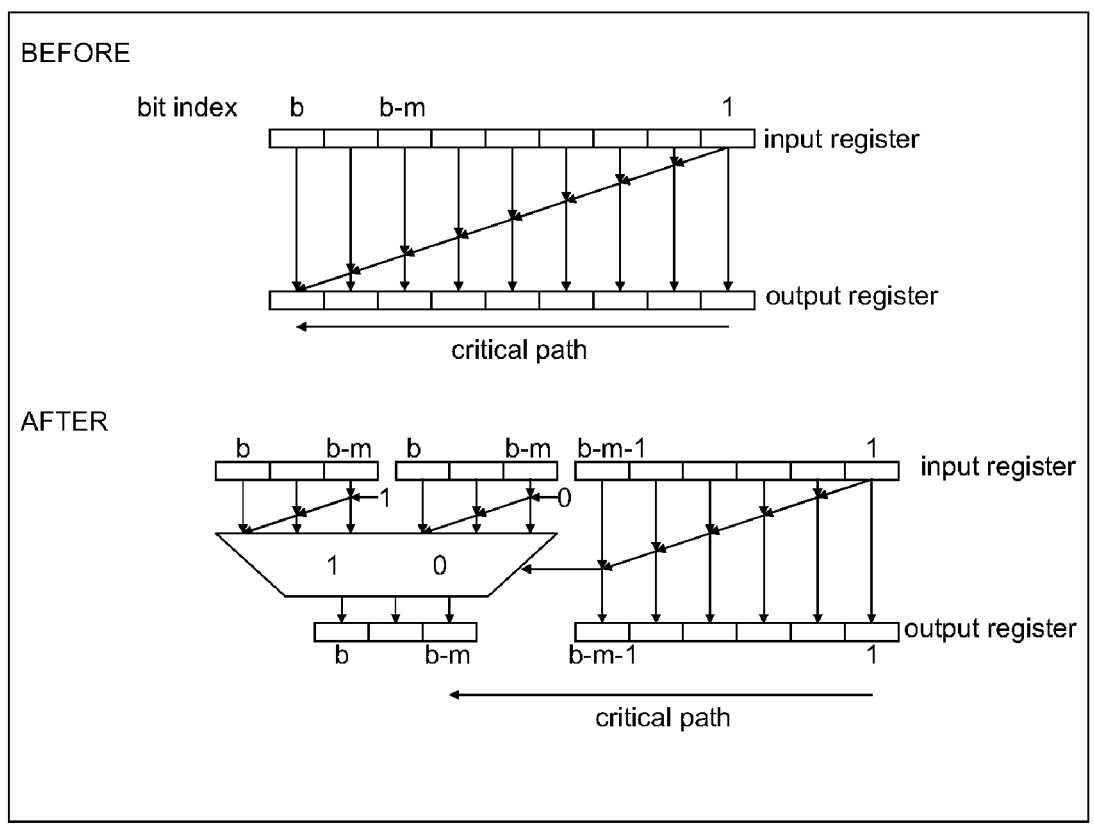
FIG. 8 is a diagram illustrating the redundant calculation technique.

The most significant extra bits (the m bits) can be removed from the critical operation using any technique known in the art. Examples for such techniques are pipeline insertion and redundant calculation. As illustrated in FIG. 7, pipeline includes inserting a pipeline 1-bit register at the stage where the operation is performed for bit index 'b–m'. The number of 1-bit registers to be inserted equals to the bitwidth of the logic operation 'b'. FIG. 8 illustrates the redundant calculation includes duplication of the combinatorial logic from stage 'b–m' until 'b'. When the results for the least significant bits (LSBs), e.g., bit number 1 to bit number 'b–m–1' are ready, two possible results for the least significant bits (MSBs), e.g., bit number 'b–m' to bit number 'b, are ready as well. Only one multiplexor stage is necessary to choose the result of the MSBs depending on the result of the LSBs.

It should be noted that the choice of the technique depends on the parameters 'b' and 'm' and on the complexity of the operation itself. When 'm' is small compared to 'b', the redundant calculation technique is usually more beneficial. On the other hand, when 'm' and 'b' are comparable in size, the pipeline insertion technique is usually more beneficial.

Figure 9:
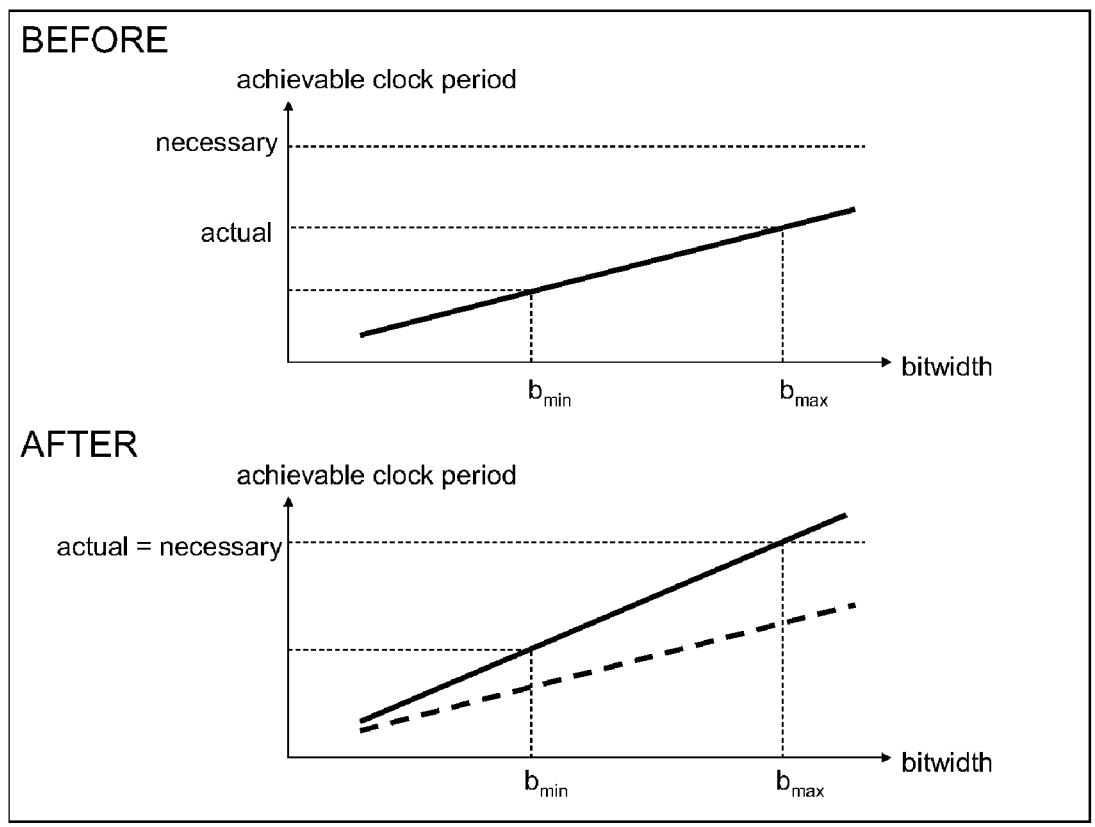
FIG. 9 shows exemplary graphs illustrating the lengthening of the non-critical paths.

At S540, non-critical operations are optimized to achieve the desired tradeoff. The optimization includes, for example, selecting gates (or cells) having different size and/or power consumption than those gates that were initially chosen. As shown in FIG. 9, changing the gates and cells properties increase the propagation delay and hence the achievable clock period for every bitwidth in the range from '$b_{min}$' to '$b_{max}$'. However, the delay increase is most significant for '$b_{max}$' and least significant for '$b_{min}$'.

Referring back to FIG. 2, where at S250 tuning parameters determined for a single instance are applied to other instances in the same group of instances. Step S250 is repeated for all groups of instances. At S260 a design of the video processor is output.

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of this invention.

The principles of the invention may be implemented in hardware, software, firmware or any combinations thereof. The software may be implemented as an application program tangibly embodied on a program storage unit or computer readable medium. The application program may be uploaded to, and executed by, a machine comprising any suitable architecture, for example a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention. All examples and conditional language recited herein are intended for pedagogical purposes to aid the reader in understanding the principles of the invention and the concepts contributed by the inventors to furthering the art, and are to be construed as being without limitation to such specifically recited examples and conditions.

All statements herein reciting principles, aspects, and embodiments of the invention, as well as specific examples thereof, are intended to encompass both structural and functional equivalents thereof. It is intended that such equivalents include both currently known equivalents as well as equivalents developed in the future, i.e., any elements developed that perform the same function, regardless of structure. Other hardware, conventional and/or custom, may also be included.

I claim:

1. A method for designing a video processor with a variable and programmable bitwidth parameter, comprising:
   selecting logical operations having propagation delay that scales substantially linearly with the bitwidth, wherein the bitwidth is variable;
   determining a desired tradeoff curve that defines a plurality of bitwidths and a plurality of pixel clock frequencies in which the video processor should function;
   grouping instances of a logic operation having same properties;
   for a single instance of each logic operation, matching an actual curve of the logic operation to the desired tradeoff curve, wherein the actual curve is determined by the propagation delay and bitwidth of the logic operation;
   applying, by a computer, matching parameters computed for a single instance to all instances in a group of instances; and
   outputting a design of the video processor.

2. The method of claim 1, wherein the plurality of bitwidths and the plurality of pixel clock frequencies are determined according to an application for which the video processor is being utilized.

3. The method of claim 2, wherein the pixel clock frequencies requirements are verified by static timing analysis, providing different sets of timing constraints for different bitwidths.

4. The method of claim 1, wherein matching the propagation delay and bitwidth of the logic operation to meet the desired tradeoff further comprising:
   determining if the logic operation is a critical operation;
   tuning the actual curve of critical operations to meet the desired curve; and
   optimizing non-critical logic operations.

5. The method of claim 4, wherein the critical operation is a logic operation having a slack higher than a predefined threshold or a negative slack.

6. The method of claim 4, wherein tuning the actual curve of critical operations further comprising:
   inserting a pipeline when an offset of the actual curve is larger than the offset of the desired curve; and
   performing a uniform gate sizing to match the slopes of the actual curve and the desired curve.

7. The method of claim 4, further comprising:
   when the actual curve and the desired curve cannot be matched,
      partitioning the bitwidth of the logic operation to a group of bits including an effective bitwidth that matches the desired curve and a group of an extra bitwidth; and
      removing the bits in the extra bitwidth group from the logic operation.

8. The method of claim 4, wherein optimizing the non-critical logic operations further comprising: changing properties of logic gates performing the logic operations, wherein the properties include at least one of: a gate size and power consumption of a gate.

9. A non-transitory computer-readable medium having stored thereon computer executable code for performing for designing a video processor with a variable and programmable bitwidth parameter, comprising:
   selecting logical operations having propagation delay that scales substantially linearly with the bitwidth, wherein the bitwidth is variable;
   determining a desired tradeoff curve that defines a plurality of bitwidths and a plurality of pixel clock frequencies in which the video processor should function;
   grouping instances of a logic operation having same properties;
   for a single instance of each logic operation, matching an actual curve of the logic operation to the desired tradeoff curve, wherein the actual curve is determined by the propagation delay and bitwidth of the logic operation;
   applying matching parameters computed for a single instance to all instances in a group of instances; and
   outputting a design of the video processor.

10. The non-transitory computer-readable medium of claim 9, wherein the plurality of bitwidths and the plurality of pixel clock frequencies are determined set of frequencies required by the application for which the video processor is being utilized.

11. The non-transitory computer-readable medium of claim 10, wherein the pixel clock frequencies requirements are verified by a static timing analysis tool, thereby providing different sets of timing constraints for different bitwidths.

12. The non-transitory computer-readable medium of claim 9, wherein matching the propagation delay and bitwidth of the logic operation to meet the desired tradeoff further comprising:

determining if the logic operation is a critical operation;

tuning the actual curve of critical operations to meet the desired curve; and optimizing non-critical logic operations.

13. The non-transitory computer-readable medium of claim 12, wherein a critical operation is a logic operation having a slack higher than a predefined threshold or a negative slack.

14. The non-transitory computer-readable medium of claim 12, wherein tuning the actual curve of critical operations further comprising:

inserting a pipeline when an offset of the actual curve is larger than the offset of the desired curve; and performing a uniform gate sizing to match the slopes of the actual curve and the desired curve.

15. The non-transitory computer-readable medium of claim 12, further comprising:

when the actual curve and the desired curve cannot be matched, partitioning the bitwidth of the logic operation to a group of bits including an effective bitwidth that matches the desired curve and a group of an extra bitwidth; and removing the bits in the extra bitwidth group from the logic operation.

16. The non-transitory computer-readable medium of claim 12, wherein optimizing the non-critical logic operations further comprising: changing properties of logic gates performing the logic operations, wherein the properties include at least one of: a gate size and power consumption of a gate.

* * * * *